United States Patent Office 2,784,574
Patented Mar. 12, 1957

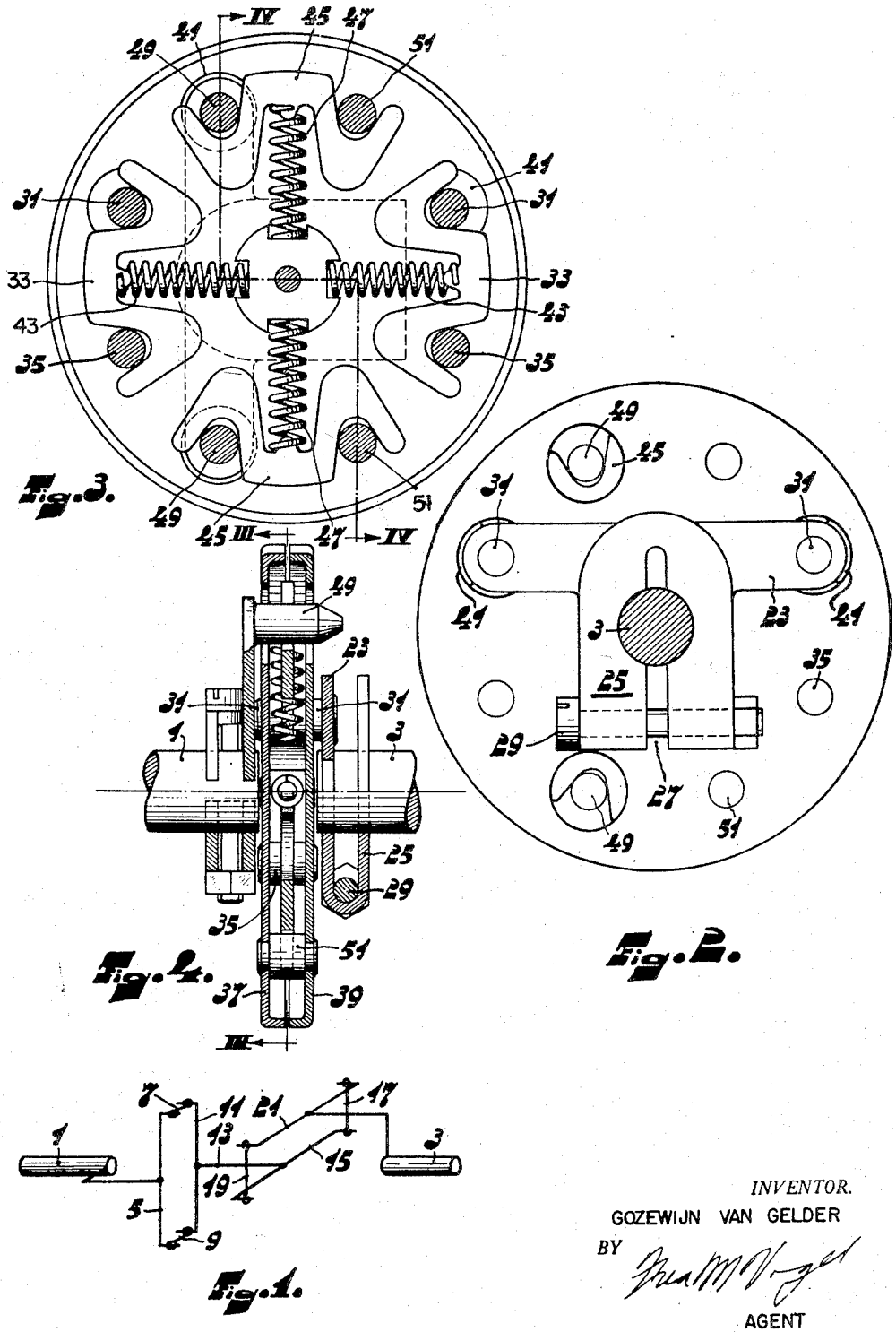

2,784,574

TRANSVERSELY FLEXIBLE COUPLING

Gozewijn Van Gelder, Hilversum, Netherlands, assignor to Hartford National Bank and Trust Company, Hartford, Conn., as trustee Application June 3, 1954, Serial No. 434,228

Claims priority, application Netherlands June 6, 1953

6 Claims. (Cl. 64—10)

This invention relates to a coupling which is transversely flexible but free from play with respect to the motion of rotation, the torque being transmitted from one coupling portion to the other driven portion through a "floating" intermediate member which is coupled to each coupling portion by means of two links bars connected at one end to the coupling portion and at the other end to the intermediate member and rotatable about shafts parallel to and located on both sides of the shaft of the coupling, the pivotal points of said bars being the corner points of a parallelogram which extends in a plane substantially at right angles to the axis of the coupling, and the sides of the two parallelograms situated on the intermediate member extending at right angles to each other. Such a device permits of coupling two shafts not exactly in line with each other and has the advantage that the angular displacements of the two shafts are invariably equal.

The invention provides a particularly cheap and practicable embodiment of the device described, which also permits of coupling shafts not exactly in line with each other. This embodiment is characterized in that the bars are substantially W-shaped plates which are subjected to radial spring pressure and in each of which a pin secured to a coupling part and to the intermediate member respectively are journalled without clearance.

In order that the invention may be readily carried into effect it will now be described with reference to the accompanying drawings, in which Fig. 1 represents a known device made from wire, which is based on the same principle as the invention, Fig. 2 is an axial view of an advantageous embodiment of the invention, Fig. 3 is a section thereof through a plane at right angles to the axis, and Fig. 4 is a section on the broken line IV—IV of Fig. 3 (and Fig. 2).

The "wire model" shown in Fig. 1 serves to couple two shafts 1 and 3. The device mainly comprises two coupling portions, each of which is connected to one of the shafts 1 and 3, a "floating" intermediate member and a number of pivotal link rods interconnecting said parts. The coupling portion connected to the shaft 1 mainly consists of a length of wire 5 which crosses the shaft 1 at right angles and whereof the ends are bent over in the direction of the shaft 1. The bent ends constitute pivots for two uniform wires 7 and 9 which act as connecting rods and are pivoted at the other end to the ends of a wire 11 substantially resembling the wire 5 so that the pivotal points of the wires 5, 7, 9 and 11 constitute the corner points of a parallelogram.

The wire 11 is connected through a piece 13, which extends substantially co-axially of the shafts 1 and 3, to the centre of a wire 15 which crosses the wire 11 at right angles and forms an assembly with two connecting rods 17 and 19 and a wire 21 which is connected to the shaft 3 and resembles the parallel wire 15. The pivotal points of this assembly also constitute the corner points of a parallelogram. The parallelogram sides situated on the intermediate member and approximately corresponding to the wires 11 and 15 extend at right angles to each other.

Each parallelogram permits the intermediate member 11, 13, 15 to move freely with respect to the associated shafts 1 and 3 and since the two directions of motion are at right angles to each other it is possible, as is seen from the drawing, to transmit a torque, for example from the shaft 1 to shaft 3 even if said shafts do not extend exactly in line with each other. Furthermore it is found that the angular displacement of the shaft 3 invariably corresponds to that of the shaft 1.

Figs. 2, 3 and 4 show a coupling whereof the operation is based on the principle illustrated in Fig. 1. One coupling part, the part connected to the shaft 3, comprises a substantially T-shaped piece 23 of sheet material whereof the vertical limb 25 is provided with a longitudinal slot 27 and is U-shaped, that portion of the U-shaped portion 25 which is divided into two strips by the slot 27 being provided with two registering openings for the passage and attachment of the shaft 3. The two strips, into which the U-shaped part 25 is divided by the slot 27, are contracted by means of a bolt 29 to clamp the shaft 1 in the coupling part 23.

The free ends of the arms of the T-piece 23 are provided with transverse pins 31 (Fig. 4) which extend parallel to the shafts 1 and 3 and correspond to the bent ends of the wire 21 shown in Fig. 1. Said pins co-operate with substantially W-shaped plates 33 (Fig. 3) corresponding to the rods 17 and 19. In each of said plates one of the pins 31 on the one hand and a pin 35 on the other hand is journalled without play, the last-mentioned pin corresponding to one of the ends of the wire 15 of Fig. 1 and being connected to two parallel discs 37 and 39 mainly constituting the floating intermediate member. The edges of said disc are bent inwardly and the W-shaped plates 33 are housed in the case thus formed. The pins 31 pass through sufficiently wide openings 41 of the case.

The case 37, 39 furthermore contains radially acting compression springs 43 by which the plates 33 are maintained under tension and which ensure that the pins 31 and 35 co-act with the plates without play. As is seen from Fig. 3 the springs 43 act at the centre of the W's at points more remote from the main shaft than the centre of the line connecting the pins 31 and 35, thus counteracting tilting over of the W-shaped plates 33.

The case 37, 39 furthermore contains a second set of W-shaped plates 45 with associated springs 47 and pins 49, 51 which constitute the parallelogram joint between the intermediate member and the shaft 3 (cf. parallelogram 5, 7, 9, 11 of Fig. 1).

As is seen from the foregoing the coupling described with reference to Figures 2 and 4 mainly consist of stamped parts to which a few short pins have been secured by riveting. Stamping and riveting are simple treatments so that the coupling is very cheap. It is eminently suitable for devices in which only small couples need be transmitted at low speeds but stringent requisites are imposed on freedom from play and on uniform angular displacement of shafts, for example in high frequency apparatus comprising automatically tunable oscillatory circuits. The shaft to be driven may, for example, be that of a rotary capacitor and the driving shaft forms part of a so-called shaft positioning mechanism which permits a number of predetermined positions of the capacitor to be accurately positioned at will, even if the two shafts do not extend exactly in line with each other. Since the pins 31 and 49 are axially movable with respect to the plates 33 and 45 without appreciably affecting the angular displacement of the shafts, it is even possible for the latter to be slightly misaligned.

At variance with the condition shown in Fig. 3, the plates 33 and 45 may be provided conversely, that is to say with the lower ends of the W's outwards. In this case the associated springs 43 and 47 should be drawsprings.

What is claimed is:

1. A coupling for a pair of rotating shafts being transversely flexible but immovable in the direction of rotation of said shafts comprising a pair of spaced coupling elements, a floating intermediate member therebetween, a plurality of substantially W-shaped plates housed in said intermediate member, a plurality of pins linking said W-shaped plates with said coupling elements, at least one of said pins being journalled free from play in one of said W-shaped plates, and spring means biasing said W-shaped plates in the radial direction of said coupling.

2. A coupling as set forth in claim 1 wherein said W-shaped plates are positioned with the lower ends of the W's of each of said plates extending in a radial plane and each of said springs engaging the center of each of said plates.

3. A coupling as set forth in claim 2 wherein each of said springs engages each of said plates at a point more remote from said shafts to be coupled than the center line connecting two of said pins which link said W-shaped plates to said coupling elements.

4. A coupling as set forth in claim 1 wherein said intermediate meber includes a pair of substantially parallel discs between which said W-shaped plates are mounted.

5. A coupling as set forth in claim 1 wherein each coupling element is susbtantially T-shaped and provided with a vertical part, said vertical part of said coupling element being bent in the form of a U, one of said rotating shafts in the opening between the legs of the U, and a pin connecting opposite ends of said horizontal part of said coupling element to said W-shaped plates.

6. A coupling as set forth in claim 5 further comprising bolt means passing through the free ends of the U-shaped vertical part to clamp each of said rotating shafts between the legs thereof.

References Cited in the file of this patent

UNITED STATES PATENTS

| | | |
|---|---|---|
| 2,433,791 | Smith | Dec. 30, 1947 |

FOREIGN PATENTS

| | | |
|---|---|---|
| 714,773 | France | Sept. 14, 1931 |
| 895,369 | France | Apr. 3, 1944 |